(12) United States Patent
Bornes et al.

(10) Patent No.: US 10,328,608 B2
(45) Date of Patent: Jun. 25, 2019

(54) SYSTEM AND METHOD FOR PRODUCING RUBBER MIXTURES FOR VEHICLE TIRES COMPRISING A SPRAY SYSTEM AND AN ASPIRATION SYSTEM

(71) Applicant: COMPAGNIE GENERALE DES ETABLISSEMENTS MICHELIN, Clermont-Ferrand (FR)

(72) Inventors: Stephane Bornes, Clermont-Ferrand (FR); Lionel Le Bars, Clermont-Ferrand (FR); Stephan Otto, Clermont-Ferrand (FR); Christian Signoret, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 0 days.

(21) Appl. No.: 15/767,534

(22) PCT Filed: Nov. 30, 2016

(86) PCT No.: PCT/EP2016/079296
§ 371 (c)(1),
(2) Date: Apr. 11, 2018

(87) PCT Pub. No.: WO2017/102332
PCT Pub. Date: Jun. 22, 2017

(65) Prior Publication Data
US 2018/0290336 A1    Oct. 11, 2018

(30) Foreign Application Priority Data
Dec. 15, 2015 (FR) .................................. 15 62365

(51) Int. Cl.
*B60C 11/00* (2006.01)
*B29B 7/84* (2006.01)
(Continued)

(52) U.S. Cl.
CPC ............... *B29B 7/24* (2013.01); *B29B 7/566* (2013.01); *B29B 7/606* (2013.01); *B29B 7/724* (2013.01);
(Continued)

(58) Field of Classification Search
CPC ....... B29B 7/24; B29B 7/7461; B29B 7/7495; B29B 7/7485; B29B 7/724; B29B 7/606;
(Continued)

(56) References Cited

U.S. PATENT DOCUMENTS 1,953,721 A * 4/1934 Olson ..................... B29B 7/724
236/1 R
4,840,491 A * 6/1989 Hagiwara ............... B29B 7/568
366/69
(Continued)

FOREIGN PATENT DOCUMENTS

EP  0 979 714 A1  2/2000
FR  2 978 370 A1  2/2013
(Continued)

*Primary Examiner* — Charles Cooley
(74) *Attorney, Agent, or Firm* — Venable LLP

(57) ABSTRACT

A system and a method are provided for producing rubber mixtures. The system includes installations for performing a monopassage process and a multipassage process to produce a rubber mixture, and a transport system that transports the rubber mixture to one or more of the installations according to a selected recipe. The installations include a mixing and cooling installation that performs a mixing and cooling procedure in which the rubber mixture is formed into a sheet, the sheet is sprayed with water using at least one nozzle provided with water at a predetermined water flow rate and air at a predetermined air pressure, and evaporated water from the spraying of the sheet is evacuated at a predetermined air flow rate. The mixing and cooling procedure causes the rubber mixture of the sheet to reach target (Continued)

temperature and water-content values before a complementary mixing procedure is performed.

18 Claims, 5 Drawing Sheets

(51) Int. Cl.
  *B29B 7/82* (2006.01)
  *B29B 7/74* (2006.01)
  *B29B 7/72* (2006.01)
  *B29B 7/60* (2006.01)
  *B29B 7/56* (2006.01)
  *B29B 7/24* (2006.01)
  *B29B 7/18* (2006.01)

(52) U.S. Cl.
  CPC .......... *B29B 7/7461* (2013.01); *B29B 7/7485* (2013.01); *B29B 7/7495* (2013.01); *B29B 7/826* (2013.01); *B29B 7/84* (2013.01); *B29B 7/183* (2013.01); *B60C 11/00* (2013.01)

(58) Field of Classification Search
  CPC  B29B 7/566; B29B 7/183; B29B 7/82; B29B 7/823; B29B 7/826; B29B 7/84; B60C 11/00
  See application file for complete search history.

(56) References Cited

U.S. PATENT DOCUMENTS

| | | | |
|---|---|---|---|
| 9,533,431 B2 * | 1/2017 | Magne | B29B 7/566 |
| 2009/0238027 A1 | 9/2009 | Yamaguchi et al. | 366/73 |
| 2014/0200307 A1 | 7/2014 | Loubaresse et al. | C08L 7/00 |
| 2018/0290336 A1 * | 10/2018 | Bornes | B29B 7/24 |
| 2018/0290338 A1 * | 10/2018 | Juillard | B29B 7/566 |

FOREIGN PATENT DOCUMENTS

| | | | | |
|---|---|---|---|---|
| FR | 2 984 206 A1 | 6/2013 | | |
| GB | 423637 | 2/1935 | | |
| JP | S 63-168312 A | 7/1988 | | |
| JP | H 05-305612 A | 11/1993 | | |
| JP | 2001-322118 A | 11/2001 | | |
| JP | 2002-144398 A | 5/2002 | | |
| JP | 2005-178257 A | 7/2005 | | |
| JP | 4802754 B2 * | 10/2011 | | B29B 7/82 |
| JP | 4853038 B2 * | 1/2012 | | B29B 7/005 |
| JP | 4867436 B2 * | 2/2012 | | B29B 7/82 |

* cited by examiner

SYSTEM AND METHOD FOR PRODUCING RUBBER MIXTURES FOR VEHICLE TIRES COMPRISING A SPRAY SYSTEM AND AN ASPIRATION SYSTEM

TECHNICAL FIELD

The present invention relates generally to the production of rubber mixtures and vehicle tires made therefrom. More particularly, the present invention relates to the complete production of rubber mixtures by selective execution of production sequences.

BACKGROUND

In the manufacture of tires, it is required that the tire exhibit various performances (e.g., reduced rolling resistance, improved wear resistance, a comparable grip in wet and dry conditions, the estimated mileage, etc.). The tires are therefore made of various types of rubber compounds having properties critical for operation of the tire itself. For example, the patent FR2978370 discloses a process wherein the final temperature rises in a short time and at a very high level that greatly reduces the energy dissipation phenomena inside the material. The U.S. Pat. No. 4,840,491 discloses a method for controlling Mooney values by forming a sheet with a thickness not exceeding 3 mm. The publication US2009/0238027 discloses a method that uses a device for mixing rubber having a stable viscosity.

To ensure that a marketable tire has the expected performance, a rubber compound can be selected from a variety of rubber mixtures, each having various ingredients mixed in different amounts and derived from a variety of production sequences. Depending on the desired characteristics, such sequences may be carried out once, twice or even several times.

Although multiple types of rubber compounds are contemplated in the tire production process, there is a choice of, and an optimized implementation of, equipment that adapts itself to the choice of, the rubber mixture production sequence. Optimal productivity is therefore possible, while retaining the availability of diverse rubber properties.

SUMMARY

The presently disclosed invention provides a system for producing rubber mixtures having expected properties. The system includes a series of rubber mixture production installations that define monopassage and multipassage sequences of rubber mixture production. Each rubber mixture production installation permits execution of at least one rubber mixture production process. The system also includes a transport means that sequentially directs a rubber mixture to at least one rubber mixture production installation according to a rubber mixture recipe selected for producing a rubber mixture having expected properties. The series of rubber mixture production installation includes at least one mixing and cooling installation that performs a mixing and cooling process. The mixing and cooling installation has at least one external mixer having a pair of cylinders for transforming the rubber mixture into a continuous sheet and at least one spray system having one or more spray rails positioned at each of an upper spray station and a lower spray station. Each spray rail is in communication with a source for supplying water and air to one or more nozzles at a predetermined water flow rate and a predetermined air pressure. At least one aspiration system is provided that includes one or more aspiration hoods positioned downstream of each spray rail. Each aspiration hood is in communication with a source for supplying air at a predetermined air flow rate. During the mixing and cooling process, the mixing and cooling installation sprays the continuous sheet and evacuates the air containing the evaporated water in order to produce the rubber mixture at target values of temperature and water content before a complementary mixing process.

For certain embodiments of the invention, the rubber mixture production installations include at least one initial mixing installation that performs an initial mixing process and one or more rubber mixture production installations. The rubber mixture production installations include at least one end-of-line installation that performs an end-of-line process and at least one complementary mixing installation that performs the complementary mixing process.

For certain embodiments of the invention, the initial mixing installation includes at least one internal mixer having a chamber of a predetermined filling volume for receiving and mixing an elastomeric material with one or more initial ingredients during the initial mixing process. The complementary mixing installation includes at least one ramless mixer having a chamber with a predetermined filling volume approximately two times greater than a predetermined filling volume of the internal mixer, the chamber receiving and mixing the rubber mixture with one or more complementary ingredients.

For certain embodiments of the invention, the initial mixing process includes producing a mixture of rubber having a temperature not exceeding 180° C., and the complementary mixing process includes producing a mixture of rubber having a temperature not exceeding 110° C.

For certain embodiments of the invention, a target value of the temperature of the rubber mixture is about 70° C., and a target value of the water content of the rubber mixture does not exceed about 0.20% by weight of the rubber mixture.

For certain embodiments of the invention, the transport means includes a transport installation configured for selective transfer of a rubber mixture to a preselected rubber mixture production installation. The transport installation includes an optional evacuation station including a spray rail and an aspiration hood; a retractable conveyance that allows selective transfer to the complementary mixing installation or to the end-of-line installation; and a conveyance that performs the selective transfer to the end-of-line installation. In some embodiments, the retractable conveyance is positioned for performing a complementary mixing process from which the rubber mixture will be transferred to the end-of-line installation. In some embodiments, the retractable conveyance is positioned for transfer to the end-of-line installation without performing the complementary mixing process.

For certain embodiments of the invention, the end-of-line installation includes one or more of profiling, sampling, processing, cooling and palletizing equipment for performing an end-of-line process.

The system produces rubber mixtures from recipes with monopassage sequences or from recipes with multipassage sequences without the need for separate equipment.

The invention also provides a method for selectively producing a rubber mixture from one or more sequences according to a selected rubber mixing recipe. The method includes providing a system as described herein; sequentially directing a rubber mixture to at least one rubber mixture production installation in accordance with a selected rubber mixture recipe; and selectively transferring the rubber mixture to a preselected rubber mixture installation.

Other aspects of the presently disclosed invention will become readily apparent from the following detailed description.

BRIEF DESCRIPTION OF THE DRAWINGS

The nature and various advantages of the presently disclosed invention will become more apparent upon consideration of the following detailed description, taken in conjunction with the accompanying drawings, in which like reference characters refer to like parts throughout, and in which.

DETAILED DESCRIPTION

Figure 1:
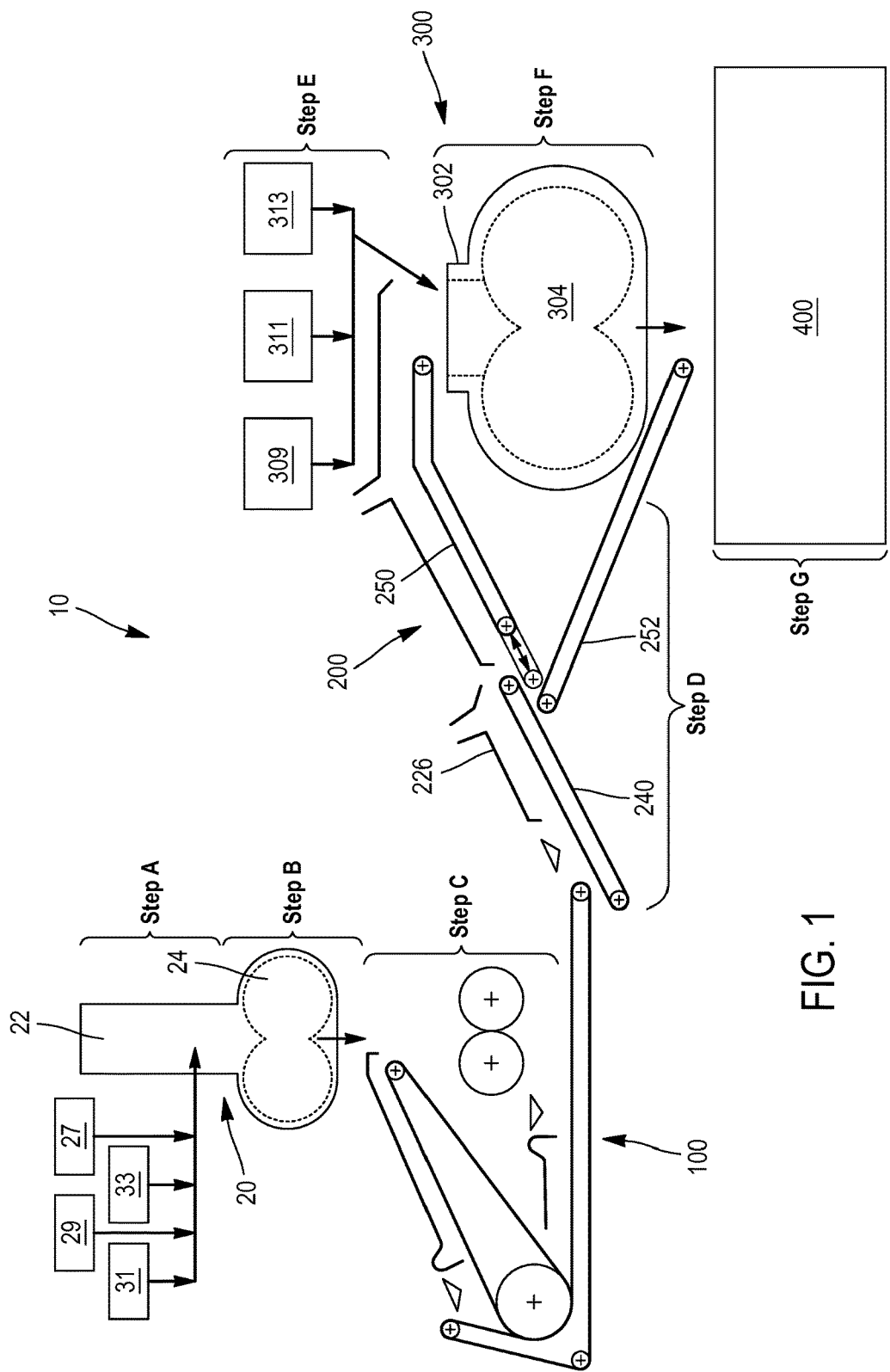
FIG. 1 shows a schematic view of an exemplary system for producing rubber mixtures according to exemplary rubber production processes of the present invention.

Reference now will be made in detail to embodiments of the invention, one or more examples of which are illustrated in the drawings. Each example is provided by way of explanation and not by limitation of the presently disclosed invention. Selected combinations of aspects of the disclosed technology correspond to a plurality of different embodiments of the present invention. It will be apparent to those skilled in the art that various modifications and variations can be made in the present invention without departing from the scope or spirit of the invention. For instance, features or steps illustrated or described as part of one embodiment can be used with one or more other embodiments to yield at least one further embodiment. Additionally, certain features may be interchanged with similar devices or features not expressly mentioned which perform the same or similar function. Thus, it is intended that the present invention covers such modifications and variations as come within the scope of the appended claims and their equivalents.

Now referring further to the figures, in which like numbers identify like elements, FIG. 1 shows an exemplary system 10 for producing one or more rubber products to be incorporated into one or more vehicle tires. It is contemplated that system 10 enables production of rubber mixtures having variable and customizable properties as determined by the performance properties of the resulting tire. As used herein, the term "tires" includes but is not limited to tires used with lightweight vehicles, passenger vehicles, utility vehicles (including heavy trucks), leisure vehicles (including but not limited to bicycles, motorcycles, ATVs, etc.), agricultural vehicles, military vehicles, industrial vehicles, mining vehicles and engineering machines. It is also contemplated that the products produced by the presently disclosed invention include full and partial tire treads such as those used in known retreading processes.

System 10 includes a series of rubber mixture production installations that together delineate one or more sequences of rubber mixture production. Each rubber production installation enables performance of at least one rubber mixture production process. A rubber mixture is obtained and sequentially directed to one or more of the rubber production installations according to a variety of rubber mixture recipes. System 10 allows sequential execution of rubber production processes until the resulting rubber exhibits the desired performance properties, which properties are variable and adaptable according to the rubber mixture recipe.

The rubber mixture that is selected for production in a given mixing cycle may be selectively obtained from a production sequence that is performed only once (hereinafter a "monopassage" sequence) or a production sequence that is carried out twice or more (hereinafter a "multipassage" sequence). A multipassage sequence may include one or more successive passes through at least part of the system before a final pass. The rubber mixture can thus be manufactured from a predefined recipe selected from among a plurality of rubber mixture recipes amenable to production by either by a monopassage sequence or by a multipassage sequence.

Control of the rubber mixture's properties is carried out not only by the ingredients selected for a given rubber mixture, but also by the order of their introduction as well as any intermediate steps. Since the configuration of system 10 remains static irrespective of whether it performs a multipassage or a monopassage sequence, an extensive selection of rubber mixture recipes becomes available that are suitable for the manufacture of tires. In this sense, the system allows the production of rubber mixtures from recipes with monopassage sequences or recipes with multipassage sequences without the need for separate equipment.

Still referring to FIG. 1, among the rubber production installations provided with system 10 is an initial mixing installation 20 that performs an initial mixing process. Mixing installation 20 includes at least one internal mixer 22 having a chamber 24 of a predetermined fill volume. Internal mixer 22 includes one or more mixing blades (not shown) that ensure penetration of rubber ingredients into an elastomer matrix. Internal mixer 22 may be selected from a variety of commercially available mixers.

In an initial step A of both monopassage and multipassage sequences (see FIGS. 1 and 3 to 5), performed at initial mixing installation 20, internal mixer 22 receives elastomeric material 27 (e.g., natural rubber, synthetic elastomer and combinations and equivalents thereof) and one or more rubber ingredients such as one or more of implementation agents 29, protection agents 31 and reinforcing fillers 33. The rubber ingredients may include one or more of carbon black or silica in varying quantities depending upon the desired performance properties of the tire. It is understood that other rubber ingredients may be introduced into internal mixer 22 with the exception of vulcanization (e.g., crosslinking) ingredients, which are introduced later in the sequence.

In a subsequent step B of both monopassage and multipassage sequences (see FIGS. 1 and 3 to 5), also performed at initial mixing installation 20, internal mixer 22 mixes the elastomeric material and the rubber ingredients to obtain a rubber mixture therefrom. The initial mixing process employs general mixing techniques as is known in the art. In some processes, mixing takes place at a temperature of not more than 180° C.

Figure 2:
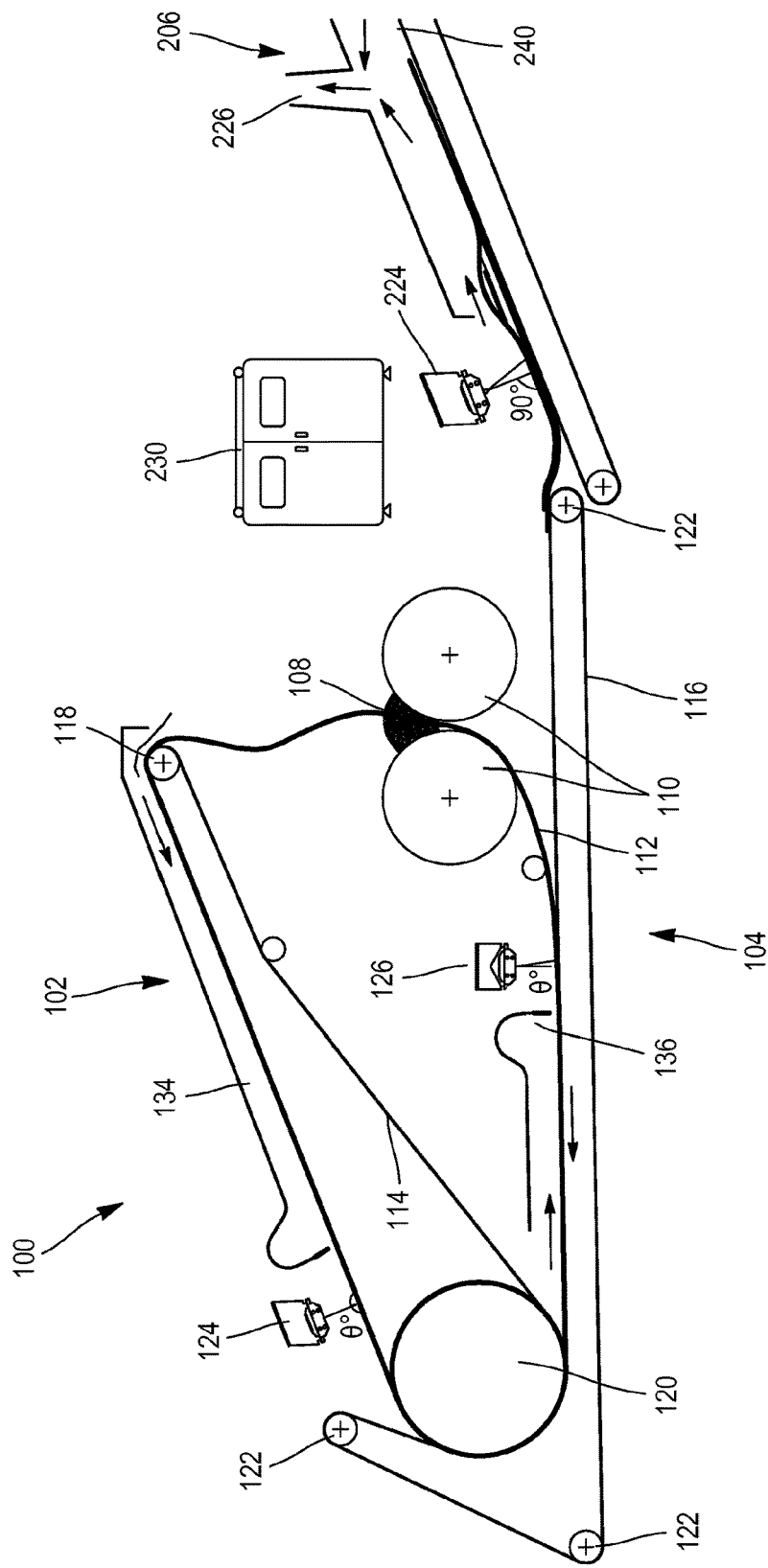
FIG. 2 shows a schematic view of an exemplary cooling installation and an exemplary evacuation station used with the system of FIG. 1.

Still referring to FIG. 1 and further to FIG. 2, a rubber mixture 108 obtained from initial mixing installation 20 is conveyed to a mixing and cooling installation 100 for performance of a cooling process thereat. Mixing and cooling installation 100 is a rubber production installation that includes at least one external mixer having a pair of cylinders 110. Each cylinder 110 has a rotational axis and the cylinders are arranged in a mutually opposed manner such that the rotational axes are parallel to one another. Cylinders 110 may exhibit identical diameters and lengths to ensure uniform and repeatable performance thereof during successive mixing cycles. One or both of cylinders 110 may have fluid or commensurate cooling means integrated therein as is known in the art. Subsequent to the initial mixing process performed at initial mixing installation 20, system 10 conveys rubber mixture 108 between cylinders 110 to form a continuous sheet 112 having a selected thickness and width.

Mixing and cooling installation 100 also includes at least one upper spray station 102 and a lower spray station 104 that are both incorporated into a spray system that sprays water and an aspiration system. The spray system includes one or more respective spray rails 124, 126 positioned at each of the upper and lower spray stations. Each spray rail is in communication with a water supply source and an air supply source that supply water and air to one or more nozzles at a predefined water flow rate. The aspiration system includes one or more respective aspiration hoods 134, 136 positioned downstream of each rail. Each aspiration hood is in communication with an air supply source for the aspiration of air. The addition of water by the rails 124, 126 supplies the ambient air with moisture. The air containing evaporated water is aspirated to prevent the introduction of water into the rubber mixture. Each combination of rail and aspiration hood serves as a checkpoint that optimizes the cooling of rubber mixtures 108 over the entire production line.

In a step C, both for monopassage and multipassage sequences (see FIGS. 1 and 3 to 5) performed at mixing and cooling installation 100, cylinders 110 transform rubber mixture 108 into a continuous sheet 112 which then circulates according to a predefined path. The predefined path includes one or more continuous conveying means (for example one or more conveyor belts or transport equivalents). For the example of mixing and cooling installation 100 illustrated in FIG. 2, the predefined path is formed at least partly by a continuous belt 114 positioned at the upper spray station 102 and another continuous belt 116 positioned at the lower spray station 104. Belts 114, 116 are driven at least by an upper roller 118 and a lower roller 120 of larger relative diameter. One or more auxiliary rollers 122 can complement the belts 114, 116 as is known in the art. Although the belts 114, 116 are described as separate transport means, one continuous belt can replace them.

During step C, rubber mixture 108 is transported by belt 114 in a direction for treatment at upper spray station 102. Belt 114 transports rubber mixture 108 between cylinders 110 to form continuous sheet 112. Belt 116 transports the sheet in a direction for treatment at lower spray station 104. On the basis of the unique properties of rubber mixture 108, each spray rail 124, 126 sprays water at a predetermined flow rate and each respective aspiration hood 134, 136 aspirates the air. The addition of water by rails 124, 126 loads the ambient air with moisture and promotes the extraction of heat during mixing. The purpose of the aspiration is to limit condensation and thereby prevent the introduction of excess water into rubber mixture 108. Each ramp and aspiration hood combination therefore serves as a checkpoint that optimizes cooling and homogenization of the rubber mixture prior to commencement of a subsequent rubber production process.

Each rail 124, 126 should be configured to provide a water flow rate as determined by the mixing recipe of the selected rubber mixture. In some processes, the predefined water flow rate may be from about 70 liters/hour to about 400 liters/hour. Similarly, each aspiration hood 134, 136 should be configured to provide a predefined air flow rate as determined by the selected rubber mixture recipe. In some processes, the aspiration of air is selected at a level from about 5000 $m^3$/hr to about 30000 $m^3$/h.

The flow rates of water and aspiration of air may vary as long as the delivered flow rates confer to the rubber mixture the target values of temperature and water content before adding the crosslinking ingredients. For example, if, after an elapsed time, the rubber mixture temperature is greater than an expected target temperature, the water flow rate (for example, as delivered by rail 124 or rail 126) can be adjusted to a higher rate than would be delivered at a lower temperature. In some processes, the target temperature of the rubber mixture is about 70° C., at which temperature the predictability and reproducibility of the process are obtained. In some processes, the target water content does not exceed about 0.20% by mass of the rubber mixture.

The adjustment of the water flow rate can be performed alone or in combination with an adjustment of the air flow rate (e.g., by the aspiration hood 134 or the aspiration hood 136). As successful adjustments are made over time, such adjustments may be repeated to ensure that the water content of any rubber mixture is limited to the target value therefor. This value is ensured prior to the subsequent addition of vulcanization ingredients.

Referring again to FIG. 1, continuous sheet 112 is transported to a transport installation 200 that performs the selective transfer of sheet 112 to a preselected rubber mixture production installation. Transport installation 200 includes an optional evacuation station 206 having a spray system and an aspiration system for effecting an auxiliary cooling process as described above with respect to mixing and cooling installation 100. As further illustrated in FIG. 2, evacuation station 206 includes at least one spray rail 224 having nozzles which are positioned to spray sheet 112 at a predetermined water flow rate. Rail 224 includes a similar configuration to that described above with respect to rails 124, 126. At least one aspiration hood 226 is downstream of spray rail 224 and has a similar configuration to that described above with respect to aspirations hoods 134, 136. Aspiration hood 226 is positioned to aspirate air after spraying by rail 226.

When evacuation station 206 performs additional cooling of the sheet, rail 224 sprays water thereon for evacuation by aspiration hood 226. The cooling process performed at evacuation station 206 ensures that the rubber mixture exhibits a sufficient temperature and water content for sequential execution of a process in a monopassage or multipassage sequence. In other words, the sheet has properties suitable for the execution of a subsequent process, irrespective of whether the process is part of a monopassage sequence or a multipassage sequence.

In step D, for both monopassage and multipassage sequencess (see FIGS. 1 and 3 to 5), performed at the level of transport installation 200, a transport means such as an evacuation belt 240 transports sheet 112 from mixing and cooling installation 100 toward a retractable conveyance 250 or a conveyance 252, which are available at the level of transport installation 200. In some sequences, sheet 112 is maintained at the level of transport installation 200 prior to performing a subsequent process. The sequential direction of the rubber mixture toward a preselected rubber mixture production installation depends upon the selected rubber mixture. In this manner, system 10 realizes the benefits of both monopassage and multipassage sequences while permitting a selection between the two.

The pre-selected rubber mixture production installation is selected from a complementary mixing installation 300 that performs a complementary mixing process and an end-of-line installation 400 that performs at least one end-of-line process. The complementary mixing installation 300 realizes both monopassage and multipassage sequences and includes at least one ramless mixer 302 having a chamber 304 of a predefined filling volume. In some embodiments, the mixer 302 has a fill volume approximately twice that of internal mixer 22 positioned at initial mixing installation 20. Ramless mixer 302, which includes one or more mixing blades (not shown) as is known in the art, may be selected from commercially available mixers.

End-of-line installation 400, which is used for both monopassage and multipassage sequences, includes equipment for performing an end-of-line line process. This end of line process can be selected from profiling, sampling, processing, cooling, palletizing and storage of the rubber mixture. Equipment that is installed to perform the end of line process can be combined with other end-of-line equipment as needed.

Figure 3:
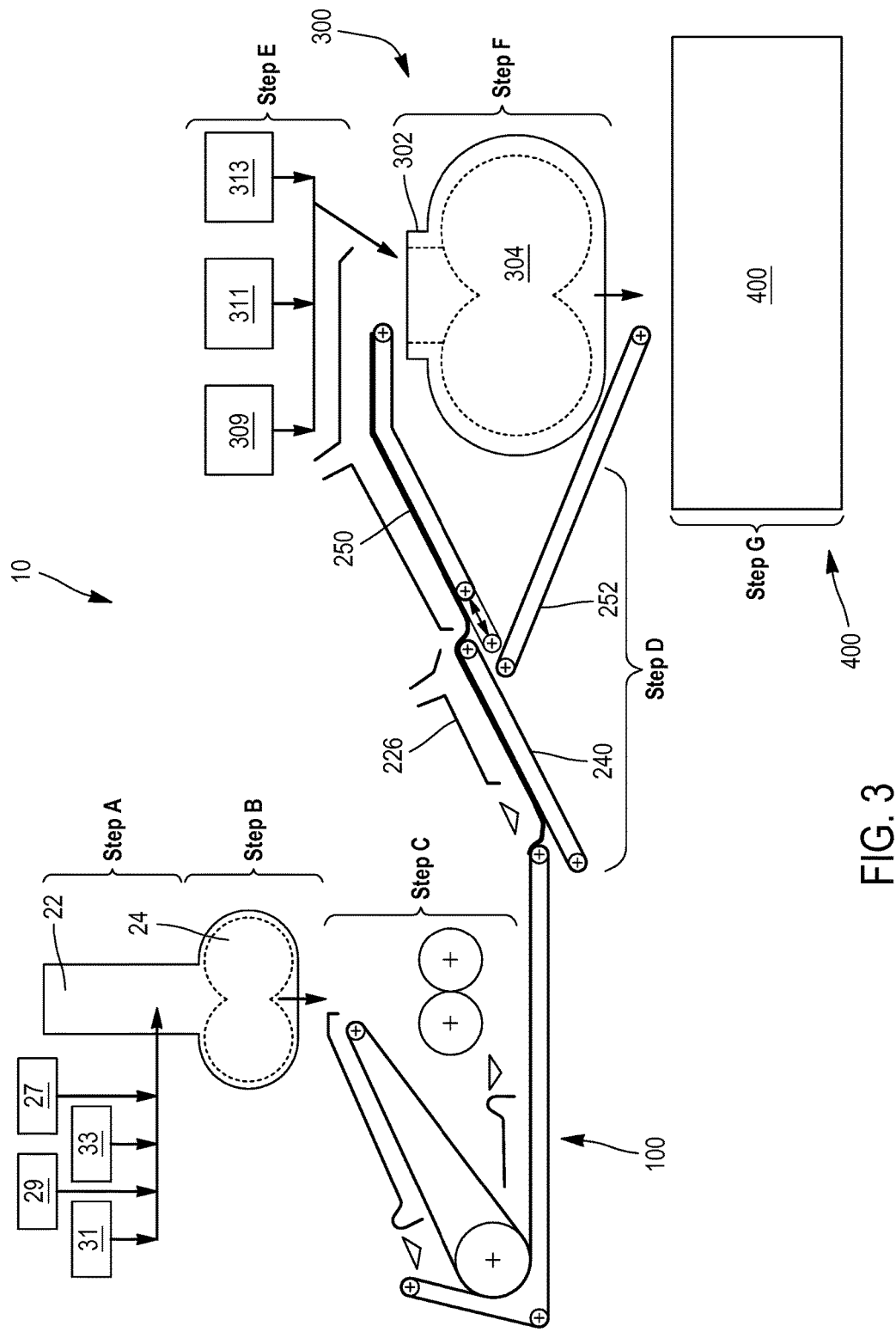
FIG. 3 shows the system of FIG. 1 during an exemplary monopassage rubber production sequence.
Figure 4:
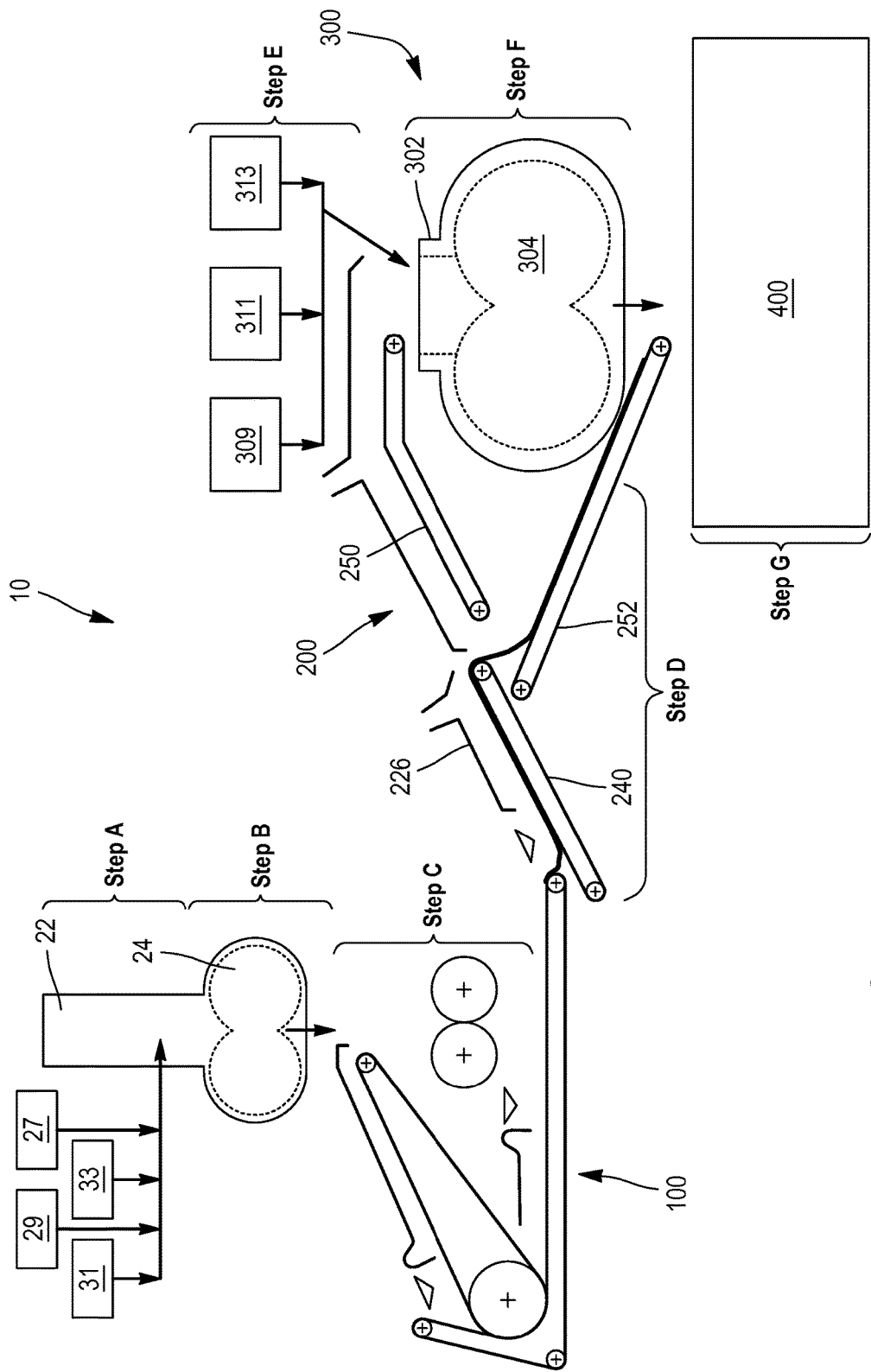
FIGS. 4 and 5 show the system of FIG. 1 during respective successive and final passages of an exemplary multipassage rubber production sequence.
Figure 5:
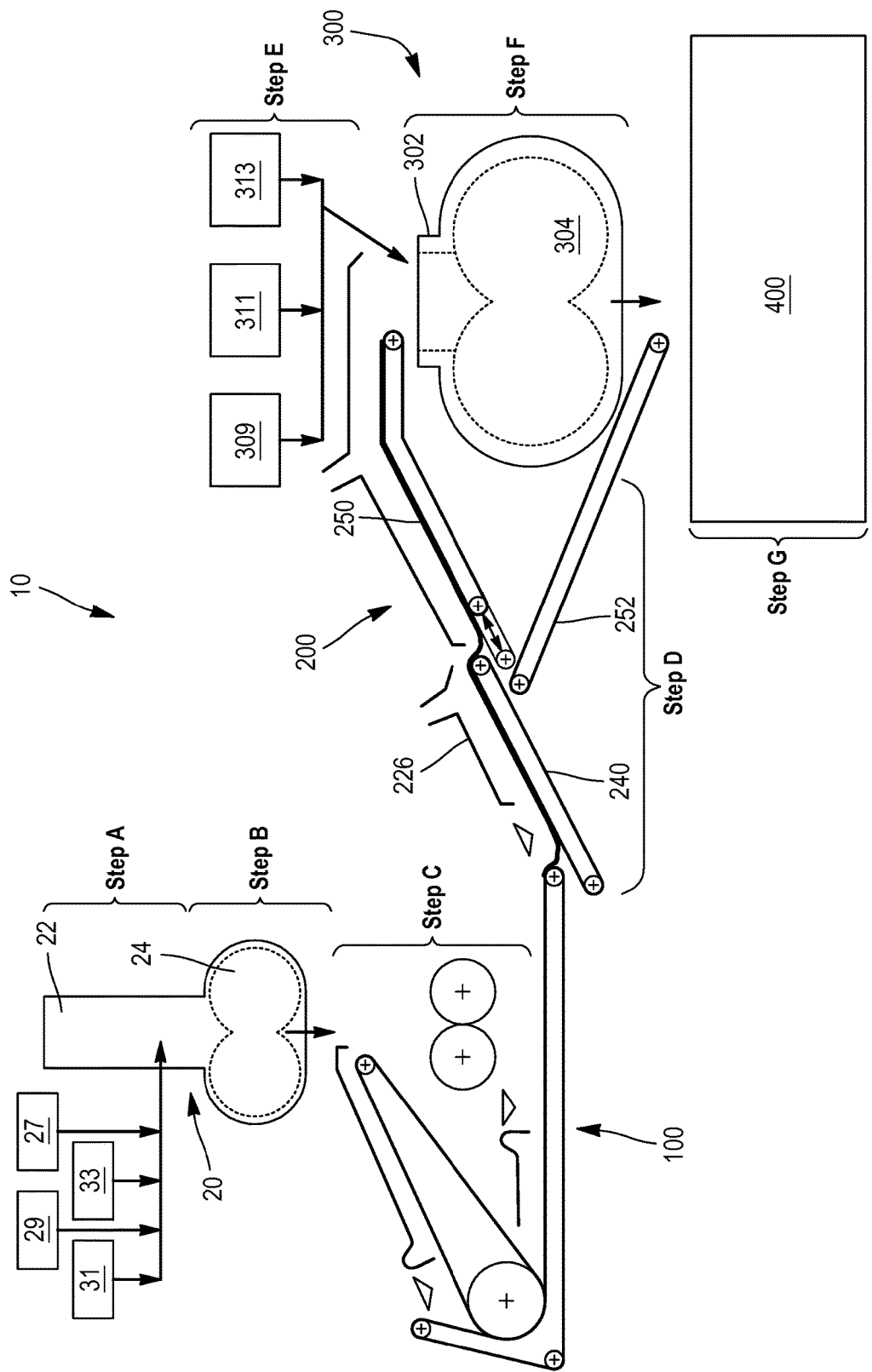

Referring further to FIGS. 3, 4 and 5, retractable conveyance 250 may be positioned for selective transfer to complementary mixing installation 300 or for selective transfer to end-of-line installation 400. During step D of a monopassage sequence (see FIG. 3), retractable conveyance 250 extends toward evacuation belt 240 to allow the continuous conveyance of sheet 112 towards complementary mixing installation 300. In such sequences, retractable conveyance 250, either alone or in combination with another conveyance, dispatches the rubber mixture for performance of a complementary mixing process.

In further reference to FIG. 4, at step D of a multipassage sequence, and in particular for one or several successive passes (i.e., the passages of the sequence before the last passage), retractable conveyance 250 withdraws from evacuation belt 240 for uninterrupted conveyance of sheet 112 to end-of-line installation 400. Conveyance 252 performs the selective transfer in by-passing complementary mixing installation 300 and transporting sheet 112 directly to end-of-line installation 400. The choice between a monopassage or a multipassage sequence therefore determines whether retractable conveyance 250 is positioned to bypass the complementary mixing installation.

System 10 eliminates non-conforming mixtures in both monopassage and multipassage sequences. While the processes reduce any possibility of waste, in the case of a non-conforming material (e.g., due to a malfunction of a mixing process), the system can prevent the material from reaching complementary mixing installation 300. Consequently, additional waste of energy and time is avoided while the advantages of different rubber mixture production sequences are preserved.

Referring further to FIG. 5, during step D of a multipassage sequence and particularly during the last passage thereof, retractable conveyance 250 extends toward evacuation belt 240 for uninterrupted transport of sheet 112 towards complementary mixing installation 300. At this stage, the rubber mixture has already been transferred to end-of-line installation 400 and subject to the execution of an end-of-line process. In some multipassage sequences with successive passages before the last passage, the rubber mixture returns to the beginning of another sequence at initial mixing installation 20 (for example, starting from step B of FIG. 4). In some multipassage sequences, one or more rubber mixtures are available at the end-of-line installation 400. One or more of these mixtures may be extracted and combined during a later passage (for example, by starting from step B of FIG. 4). For such sequences, evacuation station 206 performs further cooling steps to ensure that the water content and the temperature of any rubber mixture are restricted to target values prior to introduction of vulcanization ingredients during the complementary mixing process.

In a step E of both a monopassage sequence (see FIG. 3) and a last pass of a multipassage sequence (see FIG. 5), performed at complementary mixing installation 300, mixer 302 receives one or more complementary ingredients (e.g., crosslinking or vulcanizing ingredients) that form the crosslinking system and any complementary elastomers and necessary additives (e.g., additional elastomers and/or recycling materials 309, protection agents 311 and crosslinking agents 313). In some processes, complementary ingredients include at least one of sulfur and one or more accelerators. It is understood that other complementary ingredients can be introduced into mixer 302.

In a step F of both a monopassage sequence (see FIG. 3) and a last passage of a multipassage sequence (see FIG. 5), performed at complementary mixing installation 300, mixer 302 performs the complementary mixing process. During this process, mixer 302 mixes sheet 112 with the complementary ingredients to effect mixing of all ingredients. Upon delivery of sheet 112 to the complementary mixer, the rubber mixture has already reached the target values of temperature and water content.

During the complementary mixing process, the temperature of the rubber mixture is controlled as is known in the art (for example, by adjusting the speed of the mixing blades of mixer 302, by employing a low filling factor, etc.). In some methods, the temperature of the mixture in chamber 304 is regulated so as not to exceed 110° C. prior to delivery of the rubber to end-of-line installation 400.

In a step G of both a monopassage sequence (see FIG. 3) and a multipassage sequence (see FIGS. 4 and 5), performed at end-of-line installation 400, an end-of-line process can be performed as is known in the art. For monopassage sequences, step G is performed after completion of the complementary mixing process by complementary mixing installation 300 (see step G of FIG. 3). For multipassage sequences, step G is performed after the mixing and cooling process executed at installation 100 and without performing the complementary mixing process at complementary mixing installation 300 (i.e., after transfer of sheet 112 from evacuation station 206) (shown in FIG. 4). For multipassage sequences, step G is repeated after performance of the complementary mixing process at complementary mixing installation 300 (shown at step G of FIG. 5).

Thus, during multipassage sequences and before the final passage thereof, sheet 112 is transferred to end-of-line installation 400 without passing the sheet to mixer 302. This bypass of the complementary mixing installation avoids contamination of the rubber mixture by a crosslinking residue that may remain in chamber 304. Although the complementary ingredients are deliberately selected to perform efficient crosslinking, contamination with crosslinking residues is preferably avoided for recipes in which the rubber mixture requires an additional processing (e.g. at one or more of an end-of-line installation 400, a mixing and cooling installation 100 and an optional evacuation station 206).

System 10 includes a transport means that sequentially directs the rubber mixture to one or more of the rubber mixture production installations. As used herein, the term "transport means" or "conveyance" refers to one or more transport means or conveyances such as belts 114, 116, 240, transport installation 200, retractable conveyance 250 and equivalent and complementary transport means and conveyances. It is understood that the transport means is not limited to continuous belts and that other conveyances may be used for this purpose without departing from the scope of the present invention. The transportation can be "endless" (i.e., uninterrupted) for at least one sequence in progress and may circulate endlessly through one or more successive sequences.

The present invention contemplates the creation of rubber mixture production installations in which the rubber mixture production processes are selectively performed according to a selected rubber mixture recipe (e.g., by one or more controllers). These examples of rubber mixture production installations can follow a programmed sequence. For example, a central control center 230 (shown in FIG. 2) may be programmed with established data for a plurality of rubber mixtures, each having a unique mixing cycle profile (e.g., monopassage sequence or multipassage sequence). Additional data may include at least one predefined water flow rate to deliver for each spray rail, an air flow rate to deliver to each aspiration hood, a target temperature of the rubber mixture after an elapsed time and a target water content for the rubber mixture.

One or more sensors and/or sensor types may be optionally employed, including but not limited to environmental sensors (e.g., to sense atmospheric conditions such as temperature, pressure and/or humidity prior to initiation of a mixing cycle) and verification sensors (e.g., to sense deviation from a proscribed sequence). In this manner, the presently disclosed invention enables an increased number and variety of rubber mixtures to be produced in view of the tire to be manufactured.

While one tire may benefit from a rubber that has its properties influenced by a monopassage rubber production sequences, another tire may benefit from a rubber that has its properties influenced by a multipassage rubber production sequence. Comparable ingredients may be used for both types of sequences and are therefore amenable to manufacture on equipment that accommodates various other non-disclosed processes. Such equipment can incorporate additional beneficial rubber mixing treatment processes without compromising the quality of the resulting rubber mixture and ultimately the performance of the final product.

It is understood that one or more steps in a selected monopassage or multipassage sequence can be performed at a given time and for a fixed duration. To support the modularity of production capacity, one or more systems can be installed at a common facility with commencement of certain steps being staggered between installations (e.g., a cooling process of one system can begin within a predefined waiting time after the commencement of a cooling process by another system in the same facility). The present invention likewise contemplates equilibration of one or more steps or processes in the same system. A start time for one or more steps may be staggered in relation to a start time for other steps in the same sequence. One or more steps may conclude upon commencement of a subsequent step or may otherwise have their durations extended until the conclusion of consecutively performed step.

At least some of the various techniques described herein may be implemented in connection with hardware or software or, where appropriate, with a combination of both. For example, electrical data processing functionality may be used to implement any aspect of power computation and adjustment, including implementation in connection with a computing device (including a mobile networking apparatus) that includes hardware, software, or, where appropriate, a combination of both. The processing functionality may correspond to any type of computing device that includes one or more processing devices. The computing device can include any type of computer, computer system or other programmable electronic device, including a client computer, a server computer, a portable computer (including a laptop and a tablet), a handheld computer, a mobile phone (including a smart phone), a gaming device, an embedded controller, a near-field communication device, a device with applications implemented at least partly using a cloud service, and any combination and/or equivalent thereof (including touchless devices). Moreover, the computing device may be implemented using one or more networked computers, e.g., in a cluster or other distributed computing system. The network may be a LAN, a WAN, a SAN, a wireless network, a cellular network, radio links, optical links and/or the Internet, although the network is not limited to these network selections. A server may be further configured to facilitate communication between at least one module as presently disclosed and one or more of the computing devices.

The dimensions and values disclosed herein are not limited to a specified unit of measurement. For example, dimensions expressed in English units are understood to include equivalent dimensions in metric and other units (e.g., a dimension disclosed as "1 inch" is intended to mean an equivalent dimension of "2.5 cm").

As used herein, the term "method" or "process" may include one or more steps performed at least by one electronic or computer-based apparatus having a processor for executing instructions that carry out the steps.

The terms "at least one" and "one or more" are used interchangeably. Ranges that are described as being "between a and b" are inclusive of the values for "a" and "b."

While particular embodiments of the disclosed apparatus have been illustrated and described, it will be understood that various changes, additions and modifications can be made without departing from the spirit and scope of the present disclosure. Accordingly, no limitation should be imposed on the scope of the presently disclosed invention, except as set forth in the accompanying claims.

What is claimed is:

1. A system for producing rubber mixtures having expected properties, the system comprising:
  a plurality of rubber-mixture production installations, the production installations being arranged to perform monopassage rubber-mixture production processes and multipassage rubber-mixture production processes, each production installation being structured to execute at least one procedure of the monopassage rubber-mixture production processes and/or multipassage rubber-mixture production processes; and
  a transport system that transports a mixture of rubber to one or more of the production installations sequentially according to a sequence of a rubber-mixture recipe selected for processing the mixture of rubber to have expected properties,
  wherein the production installations include a mixing and cooling installation that performs a mixing and cooling procedure, the mixing and cooling installation including:
    an external mixer including a pair of cylinders for forming the mixture of rubber into a rubber sheet,
    a spray system including at least one spray rail positioned at each of an upper spray station and a lower spray station, each spray rail being in communication with a source for supplying water and air to one or more nozzles at a predetermined water flow rate and a predetermined air pressure, and an aspiration system including an aspiration hood positioned downstream of each spray rail, each aspiration hood being in communication with a source for evacuating air at a predetermined air flow rate, and wherein, during the mixing and cooling procedure, the mixing and cooling installation sprays the rubber sheet with water and evacuates air containing evaporated water in order to cause the rubber sheet to reach a target temperature value and a target water-content value before a complementary mixing procedure is performed.

2. The system of claim 1, wherein the production installations include:
an initial mixing installation structured to perform an initial mixing procedure,
an end-of-line installation structured to perform an end-of-line procedure, and
a complementary mixing installation structured to perform the complementary mixing procedure.

3. The system of claim 2, wherein the initial mixing installation includes an internal mixer structured with an internal-mixing chamber having a predetermined filling volume for receiving and mixing an elastomeric material with one or more initial ingredients during the initial mixing procedure to form the mixture of rubber, and
wherein the complementary mixing installation includes a ramless mixer structured with a ramless-mixing chamber having a predetermined filling volume for receiving the rubber sheet and mixing the rubber sheet with one or more complementary ingredients, the predetermined filling volume of the ramless-mixing chamber being approximately two times greater than the predetermined filling volume of the internal-mixing chamber.

4. The system of claim 2, wherein the initial mixing installation performs the initial mixing procedure so that the mixture of rubber has a temperature not exceeding 180° C., and
where the complementary mixing installation performs the complementary mixing procedure so that the rubber sheet has a temperature not exceeding 110° C.

5. The system of claim 2, wherein the transport system includes a transport installation structured to transfer the rubber sheet to a preselected rubber-mixture production installation, the transport installation including:
a conveyor portion structured to transfer the rubber sheet to the end-of-line installation, and
a retractable conveyor portion structured to move selectively to enable the rubber sheet to be transferred to the end-of-line installation via the conveyor portion or to transfer the rubber sheet to the complementary mixing installation.

6. The system of claim 5, wherein the retractable conveyor portion has:
a first position for transferring the rubber sheet to the complementary mixing installation to enable the complementary mixing procedure to be performed on the rubber sheet before the rubber sheet is provided to the end-of-line installation, and
a second position for enabling the rubber sheet to be transferred to the end-of-line installation via the conveyor portion without the complementary mixing procedure being performed on the rubber sheet.

7. The system of claim 5, wherein the end-of-line installation includes equipment for performing on the rubber sheet at least one of a profiling procedure, a sampling procedure, an end processing procedure, a cooling procedure, and a palletizing procedure.

8. The system of claim 5, wherein the transport installation further includes an evacuation station that includes a spray rail and an aspiration hood.

9. The system of claim 1, wherein the target temperature value is about 70° C., and
where the target water-content value does not exceed about 0.20% by weight of the rubber sheet.

10. The system of claim 1, wherein the system is structured to perform the monopassage rubber-mixture production processes and the multipassage rubber-mixture production processes without a need for additional equipment to be used.

11. A method for producing rubber mixtures from selected recipes, the rubber mixtures having expected properties, the method comprising steps of:
providing a system that includes:
a plurality of rubber-mixture production installations, the production installations being arranged to perform monopassage rubber-mixture production processes and multipassage rubber-mixture production processes, each production installation being structured to execute at least one procedure of the monopassage rubber-mixture production processes and/or multipassage rubber-mixture production processes, and
a transport system that transports a mixture of rubber to one or more of the production installations according to a sequence of a rubber-mixture recipe selected for processing the mixture of rubber to have expected properties,
wherein the production installations include a mixing and cooling installation that performs a mixing and cooling procedure, the mixing and cooling installation including:
an external mixer including a pair of cylinders for forming the mixture of rubber into a rubber sheet,
a spray system including at least one spray rail positioned at each of an upper spray station and a lower spray station, each spray rail being in communication with a source for supplying water and air to one or more nozzles at a predetermined water flow rate and a predetermined air pressure, and
an aspiration system including an aspiration hood positioned downstream of each spray rail, each aspiration hood being in communication with a source for evacuating air at a predetermined air flow rate, and
wherein, during the mixing and cooling procedure, the mixing and cooling installation sprays the rubber sheet with water and evacuates air containing evaporated water in order to cause the rubber sheet to reach a target temperature value and a target water-content value before a complementary mixing procedure is performed;
processing a mixture of rubber at the mixing and cooling installation to form the rubber sheet as part of a sequence according to a selected rubber-mixture recipe; and
transporting, using the transport system, the rubber sheet to a next one of the production installations in the sequence according to the selected rubber-mixture recipe.

12. The method of claim 11, further including performing at least one of:
- an initial mixing procedure at an initial-mixing installation,
- an end-of-line procedure at an end-of-line installation, and
- a complementary mixing procedure at a complementary-mixing installation.

13. The method of claim 12, wherein the mixture of rubber produced during the initial mixing procedure has a temperature not exceeding 180° C.; and
wherein the rubber sheet processed during the complementary mixing procedure has a temperature not exceeding 110° C.

14. The method of claim 12, wherein the end-of-line procedure for the rubber sheet is one of a profiling procedure, a sampling procedure, an end processing procedure, a cooling procedure, a palletizing procedure, and a rubber-mixture storing procedure.

15. The method of claim 12, further comprising a step of selectively positioning a retractable conveyor portion of the transport system at a first position or a second position, wherein:
the first position is for transferring the rubber sheet to the complementary-mixing installation to enable the complementary mixing procedure to be performed on the rubber sheet before the rubber sheet is provided to the end-of-line installation, and
the second position is for enabling the rubber sheet to be transferred to the end-of-line installation via a conveyor portion of the transfer system, without the complementary mixing procedure being performed.

16. The method of claim 11, wherein the mixing and cooling procedure includes:
forming the mixture of rubber into a rubber sheet,
spraying water onto the rubber sheet at a predetermined water flow rate, and
evacuating evaporated water, resulting from the spraying, with an aspiration source, and
wherein the mixing and cooling procedure causes the rubber sheet to reach a target temperature value and a target water-content value before a complementary mixing procedure is performed.

17. The method of claim 16, wherein the target temperature value is about 70° C., and
the target water-content value does not exceed about 0.20% by weight of the rubber sheet.

18. The method of claim 11, further comprising a step of selecting a rubber mixture from a variety of rubber mixtures, the selected rubber mixture being producible from a recipe having at least one production sequence, wherein the system is equipped to produce the selected rubber mixture according to a monopassage sequence or a multipassage sequence of the recipe without a need for additional equipment to be used.

\* \* \* \* \*